July 23, 1968 A. G. GRACE 3,394,234
TRANSMISSION SYSTEM FOR APPLYING BIAS AND RECORD SIGNALS TO A RECORDING HEAD
Filed Jan. 8, 1965
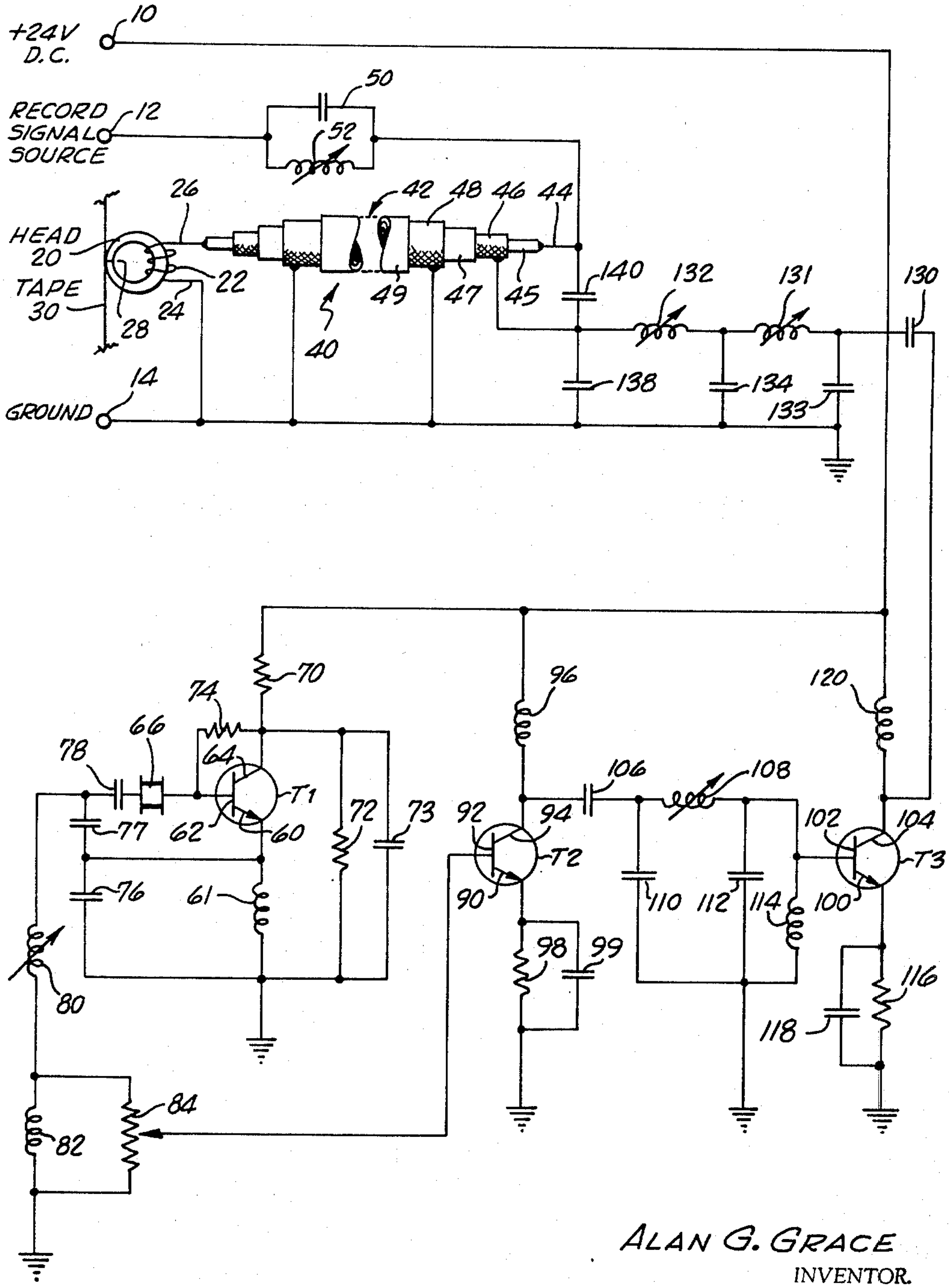
ALAN G. GRACE
INVENTOR.
BY Robert A. Clay
ATTORNEY

United States Patent Office 3,394,234

Patented July 23, 1968

3,394,234

TRANSMISSION SYSTEM FOR APPLYING BIAS AND RECORD SIGNALS TO A RECORDING HEAD

Alan G. Grace, Menlo Park, Calif., assignor to Ampex Corporation, Redwood City, Calif., a corporation of California Filed Jan. 8, 1965, Ser. No. 424,336

8 Claims. (Cl. 179—100.2)

ABSTRACT OF THE DISCLOSURE

A system for transmitting relatively low and high frequency signals to a utilization device, for example, record and bias signals to a record head of a magnetic tape recorder. The signals are transmitted by means of a coaxial cable in such a manner that there is minimized radio frequency interference and power dissipation. The low frequency signal is fed in parallel to the head, or other utilization device, through the central conductor of the cable, while the high frequency signal is coupled in series resonance with the head by capacitive coupling between a shield of the cable and central conductor.

This invention relates in general to the transmission of high frequency electrical signals and more particularly to a method of supplying bias power to a magnetic tape recorder head.

Applicant's invention will be described in connection with a magnetic tape recorder record bias system, but it is to be understood that the principles of the invention may be applied to high frequency signal transmission of all types wherein it is desired to supply high frequency power through cables of considerable length without encountering excessive radio frequency interference (RFI) or other transmission problems. In most Direct Record magnetic tape recorder systems, record bias is added to the signal to be recorded in order to confine recording to the straight line portion of the characteristic curve of the magnetic recording media being recorded upon. The amplitude of the bias signal is many times that of the recorded signal; and the frequency of the bias signal is usually selected 3.5 or more times the highest frequency to be recorded, to minimize any interaction (especially the formation of beats) which might occur between the bias frequency and the higher order harmonics of the recorded signal frequencies. Moreover, bias signal frequency is usually selected too high to be resolved by the reproduce head of the magnetic tape recorder, so that it will not be a factor in the playback process. Since it is desirable that no new sum and difference frequencies be introduced when bias is added to a signal to be recorded, it is important that bias and record signal be combined by a linear mixing process.

In the development of instrumentation magnetic tape recording, it has become desirable to practice direct recording for the purposes of achieving higher packing density, absence of spurious FM signals, and the use of a high frequency pilot signal above the recorded spectrum. The bandwidth in instrumentation recording, however, is at least 60 kc. to 5 mc. and, accordingly, the bias frequency must be at least 12–15 mc. These specifications for a direct record instrumentation recorder would be impossible to melt if both bias and record signal were driven into the record head by a single amplifier, for amplifiers are notoriously non-linear over a frequency spectrum as wide as that specified above.

Accordingly, a modern instrumentation recorder uses separate record and bias amplifiers, both of which must be located in the most immediate proximity possible to the head to avoid excessive radiation of power, creation of high frequency capacitance, and RFI. This proximate location is a great design handicap, due to the complexity and bulk of the amplifier circuit components and their associated wiring. Moreover, as recording frequencies go up, even the proximate mounting of the drive amplifiers does not provide a complete solution to the radiation, capacitance, and RFI problems.

Therefore, the general object of this invention is to provide an improved high frequency transmission system.

Another object of this invention is to provide a high frequency transmission system which in magnetic tape recording eliminates use of a common amplifier for bias and record signals prior to their entry to the record head.

Another object of this invention is to provide a high frequency transmission system with improved means for prevention of feed-through of the bias signal into the record signal source and likewise for prevention of feed-through of the record signal into the bias signal source.

Another object of this invention is to provide high frequency transmission system which keeps the transmitted signal clean of harmonic distortion.

Another object of this invention is to develop a minimum power high frequency transmission system suitable for use in high frequency and wide band magnetic tape recording.

Another object of this invention is to provide a high frequency transmission system that minimizes power radiation, spurious capacitances, and RFI at the higher frequencies sought in magnetic recording.

In the achievement of the above and other objects and as a feature of applicant's invention, there is provided a high frequency transmission system wherein one drive amplifier is coupled in parallel to the common output device while another drive amplifier is coupled in series-resonance, that is to say: through the output device, transmission line, and other stray reactances arranged in series rather than in parallel. Thus in a magnetic tape recording application of the inventive principle record current is fed to the record head in parallel while record bias is fed in series-resonance, with the result that effective series resistance is reduced by a factor of $1/Q$ (Q being defined as the ratio of reactance to resistance) because in series-resonant circuits the effects of capacitance and inductance cancel out, leaving resistance as the sole impedance. In particular, the head inductance and the adjusted cable capacitance according to this invention are matched to produce series resonance at the bias signal frequency, the general principle of power transmission being to minimize power dissipation by making the sum of the load and cable reactances of such value that series-resonance occurs at the power supply frequency.

Aa another feature of applicant's invention, where coaxial cable is used to supply record and bias current from a remote location, the record current is coupled in parallel with the head by direct connection through the cable whereas the bias current is coupled to the head in series resonance by feeding it into a shield from which it can be capacitively fed into a conductor directly coupled with the head.

As another feature of applicant's invention at least one shield of the coaxial cable outward from the bias current shield is grounded to prevent high frequency radiation, and this shunt capacitance is made in effect the last (and output-impedance determining) capacitance of the impedance-matching network (e.g., a double pi filter) feeding the cable.

Other objects and features of this invention and a fuller understanding thereof may be had by referring to the following description and claims taken in conjunction with the accompanying figure in which there is shown a schematic of a preferred embodiment of applicant's invention.

With reference to the figure, the circuit shown therein as embodying the principles of applicant's invention has a DC power supply terminal 10, a record signal source 12, and a ground terminal 14. For purposes of illustration, the DC power supply is herein specified as +24 v. DC. The function of the circuit is to supply signals to magnetic tape recorder head 20 having a winding 22 with a grounded end 24 and an input end 26. The head 20 has a gap 28 at which magnetic flux signals in the head 20 are imparted to a magnetic tape 30. Signals to the input end 26 of the winding 22 are transmitted through a coaxial cable 40 of indeterminate length as shown schematically at 42. The cable 40 is composed of successive layers beginning with an inner conductor 44 and its shielding dielectric 45, an inner shield 46 and its shielding dielectric 47, and an outer shield 48 and outer insulation 49. The outer shield 48 is coupled to ground 14; the inner conductor 44 is coupled through a bias trap comprising a capacitor 50 and variable inductor 52 to the record signal source 12. Thus, record signals are applied to the inner conductor 44 while bias signals are prevented from getting into the record signal circuitry by the bias trap 50, 52.

Bias signals are supplied to the winding 22 in the following manner: a first transistor T1 having emitter 60, base 62, and collector 64 has a crystal 66 directly coupled to its base 62 in order to form a crystal Colpitts oscillator to generate signals of the bias frequency. The emitter 60 is DC coupled to ground through an inductor 61. The collector 64 is coupled to the power supply terminal 10 through a resistor 70, to ground through the parallel combination of a resistor 72 and capacitor 73, and to the base 62 through a resistor 74. The Colpitts voltage division of the oscillator circuit is provided by two capacitors 76 and 77 coupled between ground and the crystal 66 (through a coupling capacitor 78). The emitter 60 is directly connected to a point between the capacitors 76 and 77.

The ouput of the crystal Colpitts oscillator is coupled through an impedance-matching network comprising two inductors 80 and 82 and a variable resistor 84 to a low input impedance Class C buffer stage centered about a transistor T2, having emitter 90, base 92, and collector 94. The emitter 90 is coupled to ground through the parallel combination of a resistor 98 and a capacitor 99; the base 92 is directly coupled to a slide on the variable resistor 84; and the collector 94 is coupled to the power supply terminal 10 through an inductor 96.

The output of the buffer stage is taken from the collector 94 through a coupling capacitor 106 and is pi-matched to a Class C amplifier formed by a transistor T3, having emitter 100, base 102, and collector 104, and its associated circuit elements. The pi-matching network includes a variable inductor 108 coupled between the capacitor 106 and the base 102. Capacitors 110 and 112 couple alternate ends of the inductor 108 to ground. The emitter 100 is coupled to ground through the parallel combination of a resistor 116 and a capacitor 118; the base 102 is DC coupled to ground through an inductor 114; and the collector 104 is coupled to the power supply terminal 10 through an inductor 120. The output of the Class C amplifier is coupled through a DC blocking capacitor 130 to a double-pi network comprising two variable inductors 131 and 132 in series between the capacitor 130 and the inner shield 46, and three capacitors 133, 134, and 138 coupling each terminal of the variable inductors 131 and 132 to ground. A capacitor 140 coupled between the output end of the double-pi network and the inner conductor 44 is used to trim the head inductance 22 and cable 40 circuit to make the total combination series-resonant at the bias frequency as determined by the crystal-Colpitts oscillator circuit; the capacitor 140 acts as an open circuit at the frequencies of the record signals from source 12.

In the operation of the above-described circuit, the record head 20 is fed in parallel as far as record signals (from 12) are concerned and in series-resonance as to bias signal from the crystal-Colpitts oscillator. The double-pi network serves generally to impedance-match the output of the Class C amplifier to the input impedance of the cable 40-head winding 22 circuit, while at the same time acting as a low pass filter to greatly attenuate harmonics of the bias signal.

In order to avoid applying the record current from 12 to the head winding 22 through too large a capacitance, it is fed through a high Q (preferably over 30) bias trap 50, 52 to the inner conductor 44 and thence to the winding 22. The bias trap 50, 52 isolates the record signal source 12 from the bias signal circuitry.

The series-resonance feed of the bias signal is calculated to save power by consuming only enough power to overcome head resistance. Therefore, the bias signal is fed to the inner shield 46 of the cable 40 while the head winding is coupled between the inner conductor 44 and ground 14 (in effect, the outer shield 48). Thus the capacitance between the inner shield 46 and the inner conductor 44 is in series between the winding 22 and the double-pi filter and is in parallel with the inner shield 46-outer shield 48 capacitance and its trim capacitor 138, the main determinents of output impedance of the double-pi filter. If the capacitor 138 is made sufficiently large, even for long lengths of the cable 40 the inner shield 46-inner conductor 44 capacitance will be adequately matched to the second pi (44–46) capacitance and elements 132, 134, and 138) of the double-pi filter over a wide range of head currents. The double-pi filter, of course, makes the passage of harmonics of the bias signal most difficult. The double shield cable 40 minimizes radiation of the high frequency bias signal.

In summary, the specific embodiment of applicant's invention described above illustrates the aforementioned features of the invention as follows: the head inductance 22 and the capacitance between the inner conductor 44 and the inner shield 46 (together with that of the parallel trimming capacitor 140) are driven in series between the double-pi matching network and ground 14. The capacitance in parallel with the series-resonance circuit is the capacitance between the inner conductor 46 and the grounded outer conductor 48 which together with the trimming capacitor 138 acts as the final capacitor in the double-pi impedance-matching network.

A bias and record signal supply system in accordance with the above description and drawing was built and operated using the following components.

| | |
|---|---|
| Voltage: | |
| **10** ..........v. DC | +24 |
| Transistors: | |
| **T1** | SM1161 |
| **T2** | SM1161 |
| **T3** | MM801 |
| Resistors (ohms): | |
| **70** | 620 |
| **72** | 2.4K |
| **74** | 47K |
| **84** ......(I.R.C. type 100) | 100 |
| **98** | 22R |
| **116** | 22R |

Capacitors (microfarads):

| | |
|---|---|
| 50 | $330\times10^{-6}$ |
| 73 | 1.0 |
| 76 | $220\times10^{-6}$ |
| 77 | $560\times10^{-6}$ |
| 78 | 130 |
| 99 | .05 |
| 106 | .05 |
| 110 | $430\times10^{-6}$ |
| 112 | $2000\times10^{-6}$ |
| 118 | .05 |
| 130 | .05 |
| 133 | $40\times10^{-6}$ |
| 134 | $3000\times10^{-6}$ |

Inductors (microhenries):

| | |
|---|---|
| 52 | 0.47 |
| 61 | 82 |
| 80 | 1.3 |
| 82 | 0.22 |
| 96 | 8.2 |
| 114 | 5.6 |
| 120 | 20.0 |

The above specified circuit when using a 12 mc. crystal 66 required a bias drive of only 18.3 volts peak to peak at 0.3 amps and operated well in spite of head inductance changes ranging from 2.2 microhenries to 3.5 microhenries.

Thus applicant has achieved an improved high frequency transmission system which does not require a common amplifier for the various bands of input signal being transmitted to a common utilization device, such as the record head in a magnetic tape recorder and thus minimizes harmonic distortion. Power loss in the above-described system is limited to that caused by the effective head resistance of 61 ohms since the inductances and capacitances cancel out in series resonant operation in the circuit specified. The bias voltage requirement was thereby cut from 69 volts peak-to-peak to 18.3 volts peak-to-peak, a factor of better than 3.

A number of alternative arrangements will readily suggest themselves to those skilled in the art. For example, NPN conductivity type transistors and PNP conductivity type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. In a magnetic tape recorder having a record signal source, a bias signal source, and a magnetic record head with a winding, signal transmission circuitry comprising: a coaxial cable, said coaxial cable having at least an inner conductor and a shield, a first end of the inner conductor being coupled to a first end of the head winding, a second end of the head winding being coupled to ground, a first trimming capacitor coupled between the shield and the inner conductor, said record signal source coupled to the second end of said inner conductor, said bias signal source coupled to said shield, the capacitive values of said first trimming capacitor and the capacitance between the shield of the cable and the inner conductor of the cable and the inductive value of said head being such as to comprise a series-resonant circuit at the frequency of the bias signal.

2. In a magnetic tape recorder having a record signal source, a bias signal source, and a magnetic record head with a winding, signal transmission circuitry comprising: a coaxial cable, said coaxial cable having at least an inner conductor, an inner shield, and an outer shield, a first end of the inner conductor being coupled to a first end of the head winding, the second end of the head winding being coupled to ground, the outer shield of the cable being coupled to ground, and a first trimming capacitor coupled between the inner shield and the inner conductor, the inductive value of said head winding and capacitive values of said first trimming capacitor and the capacitance between the inner shield of the cable and the inner conductor of the cable being such as to comprise a series-resonant circuit at the frequency of the bias signal, said record signal source coupled to the second end of said inner conductor, said bias signal source coupled to said inner shield.

3. In a magnetic tape recorder having a record signal source, a bias signal source, and a magnetic record head with a winding signal transmission circuitry comprising: a coaxial cable, said coaxial cable having at least an inner conductor, an inner shield, and an outer shield, a first end of the inner conductor being coupled to a first end of the head winding, the second end of the head winding being coupled to ground, the outer shield of the cable being coupled to ground, a bias trap coupled between the record signal source and a second end of the inner conductor, a double pi network including a pair of inductors in series coupled between the bias signal source and the inner shield, and a first trimming capacitor coupled bettween the inner shield and the inner conductor, the inductive value of said head winding and the capacitive values of said first trimming capacitor and the capacitance between the inner shield of the cable and the inner conductor of the cable being such as to comprise a series-resonant circuit at the frequency of the bias signal.

4. In a magnetic tape recorder having a record signal source, a bias signal source, a ground terminal, and a magnetic record head with a winding, signal transmission circuitry comprising: a coaxial cable, said coaxial cable having at least an inner conductor, an inner shield, and an outer shield, a first end of the inner conductor being coupled to a first end of the head winding, the second end of the head winding being coupled to ground, the outer shield of the cable being coupled to ground, a bias trap defined by the parallel combination of a first capacitor and a first inductor coupled between the record signal source and a second end of the inner conductor, a double pi network including a second inductor and third inductor in series coupled between the bias signal source and the inner shield, a first trimming capacitor coupled between the inner shield and the inner conductor, and a second trimming capacitor coupled between the inner shield and ground, the inductive value of said head winding and capacitive values of said first trimming capacitor and the capacitance between the inner shield of the cable and the inner conductor of the cable being such as to comprise a series-resonant circuit at the frequency of the bias signal and the capacitive value of the second trimming capacitor being such as to provide in combination with the capacitance between the inner shield and the outer shield impedance matching between the double pi network and the series resonant circuit.

5. In a magnetic tape recorder having a record signal source, a bias signal source, and a magnetic record head with a winding, signal transmission circuitry comprising: a coaxial cable having at least an inner conductor and a shield, a first end of the inner conductor being coupled to a first end of the head winding, a second end of the head winding being coupled to ground, means for coupling the record signal source to the inner conductor in such manner that bias signals on the inner conductor are disassociated from the record signal source, and means for coupling the bias signal source to the shield with the capacitance between the shield and inner conductor and the inductance of the head winding being such that the head inductance is fed at series resonance with the frequency of the bias signal.

6. In a magnetic tape recorder having a record signal source, a bias signal source, and a magnetic record head with a winding, signal transmission circuitry comprising: a coaxial cable having an inner conductor and inner and outer shields, a first end of the inner conductor being coupled to a first end of the head winding, said outer shield and the second end of said head winding being coupled to ground, a double pi network coupling said bias signal source to said inner shield of said cable, said double pi network including a pair of series inductors coupled between said bias signal source and said inner shield and including a first trimming capacitor coupled between the inner shield and ground and the capacitance between said inner and outer shields, means coupling said signal source to the second end of said inner conductor, and a second trimming capacitor coupled between said inner conductor and inner shield, said second trimming capacitor together with the capacitance between said inner shield and inner conductor and the inductance of said head winding defining a series resonant circuit at the frequency of the bias signal, said double pi network impedance matching said bias signal source and said series resonant circuit.

7. A high frequency transmission system for transmitting electrical signals of a high frequency through a coaxial cable having at least an inner conductor and a shield from a source of a high frequency signal to a utilization device having certain reactance comprising: means for impedance matching the high frequency signal source to a circuit that is made series resonant at the frequency of the signal being transmitted and is comprised of the capacitance between the shield and the inner conductor in series with the reactance of the utilization device.

8. A high frequency transmission system for transmitting relatively low and high frequency signals respectively from first and second signal sources to a utilization device comprising: a coaxial cable having at least an inner conductor and a shield, said inner conductor having a first end coupled to a first end of said utilization device and a second end coupled in receiving relation to said first signal source, said utilization device having a second end coupled to ground, said shield coupled in receiving relation to said second signal source, said utilization device having a reactance defining a series resonant circuit with the capacitance between said shield and inner conductor at the frequency of said high frequency signal.

No references cited.

BERNARD KONICK, *Primary Examiner.*

J. R. GOUDEAU, *Assistant Examiner.*